US012341464B2

(12) United States Patent
Yoshida (10) Patent No.: US 12,341,464 B2
(45) Date of Patent: Jun. 24, 2025

(54) POWER GENERATION DEVICE

(71) Applicant: HITACHI MITSUBISHI HYDRO CORPORATION, Tokyo (JP)

(72) Inventor: Masahiro Yoshida, Tokyo (JP)

(73) Assignee: HITACHI MITSUBISHI HYDRO CORPORATION, Tokyo (JP)

( * ) Notice: Subject to any disclaimer, the term of this patent is extended or adjusted under 35 U.S.C. 154(b) by 0 days.

(21) Appl. No.: 18/693,926

(22) PCT Filed: Sep. 28, 2021

(86) PCT No.: PCT/JP2021/035728
§ 371 (c)(1),
(2) Date: Mar. 20, 2024

(87) PCT Pub. No.: WO2023/053230
PCT Pub. Date: Apr. 6, 2023

(65) Prior Publication Data
US 2024/0429843 A1 Dec. 26, 2024

(51) Int. Cl.
*H02P 9/04* (2006.01)
*F03B 13/06* (2006.01)
*F03B 15/16* (2006.01)
*H02P 9/02* (2006.01)

(52) U.S. Cl.
CPC ............. *H02P 9/04* (2013.01); *F03B 13/06* (2013.01); *F03B 15/16* (2013.01); *H02P 9/02* (2013.01)

(58) Field of Classification Search
CPC .... H02P 9/04; H02P 9/02; F03B 13/06; F03B 15/16
See application file for complete search history.

(56) References Cited

U.S. PATENT DOCUMENTS 10,326,393 B2   6/2019   Yoshida
2018/0375452 A1*  12/2018   Yoshida .............. H02P 23/0027

FOREIGN PATENT DOCUMENTS

| JP | 63-302184 A | 12/1988 |
| JP | H08-317697 A1 | 11/1996 |
| JP | 2002-54549 A | 2/2002 |
| JP | 6446569 B2 | 12/2018 |

OTHER PUBLICATIONS

International Search Report received in PCT Application No. PCT/JP2021/035728, dated Nov. 16, 2021.

* cited by examiner

*Primary Examiner* — Sean Gugger
(74) *Attorney, Agent, or Firm* — Rimon P.C.

(57) ABSTRACT

A power generation device is a primary excitation variable speed pumped-storage power generation device or a primary excitation variable speed power generation device. When an output of a pump turbine or a water turbine is insufficient for a power output equivalent in a vicinity of a fully opened guide vane opening and the rotational speed decreases, an increase in a generator motor output command or a generator output command is stopped, and the stop of the increase in the generator motor output command or the generator output command is canceled after the rotational speed is increased.

2 Claims, 10 Drawing Sheets

POWER OUTPUT COMMAND LIMITER FUNCTION

POWER GENERATION DEVICE

CROSS-REFERENCE TO RELATED APPLICATIONS

This application is the U.S. National Phase under 35 U.S.C. § 371 of International Application No. PCT/JP2021/035728, filed on Sep. 28, 2021.

FIELD

The present invention relates to a variable speed pumped-storage power generation device or a variable speed power generation device, and particularly relates to a power generation device as a variable speed pumped-storage power generation device or a variable speed power generation device that performs speed control on a pump turbine or water turbine side in a power generation operation and is capable of continuing a stable operation in which output power monotonously follows a power output command.

BACKGROUND

In a system in which a pump turbine or water turbine is in charge of rotational speed control according to the power and head, and a generator motor or generator is in charge of power control for the power to directly follow a generated power output command from the outside in the power generation operation of a variable speed pumped-storage power generation device or a variable speed power generation device, while the power response that is rapid and close to the generated power output command is obtained, the speed control depends on the pump turbine flow rate control with a slow response, and speed fluctuations and overshoots are inevitable. Therefore, in a secondary excitation variable speed pumped-storage power generation device in which the variable speed width is usually less than about 10%, a protection control, such as a method of preventing the excess of the variable speed range limit by adding a power generation output correction command defined according to the rotational speed or the slip frequency to the generated power output command, is applied when the slip frequency approaches the variable speed range limit. Furthermore, a control for applying a limit by setting the maximum change rate of a generator motor output command or a generator output command to be constant when the slip frequency is within the normal operation range, multiplying the maximum change rate of the generator motor output command or the generator output command by a value from 1.0 to 0.0 in a range in which the slip frequency is below the lower limit value of the normal operation range within a predetermined value and is above the upper limit value of the normal operation range within a predetermined value, and multiplying the maximum change rate of the generator motor output command or the generator output command by zero in a range in which the slip frequency is below the lower limit value by a predetermined value or more and is above the upper limit value by a predetermined value or more, and a control for limiting the overshoot or the undershoot of a guide vane opening with respect to the optimum guide vane opening command according to the magnitude between "0.0" and the difference between the rotational speed and the optimum rotational speed command are applied.

In the power generation operation of the secondary excitation variable speed pumped-storage power generation device, a method of applying control for limiting the power command rate when the slip frequency approaches the upper and lower limits of the normal operation range, and control for limiting the overshoot or the undershoot of the guide vane opening with respect to the optimum guide vane opening command according to the magnitude between "0.0" and the difference between the rotational speed and the optimum rotational speed command are disclosed in Patent Literature 1.

Figure 4:
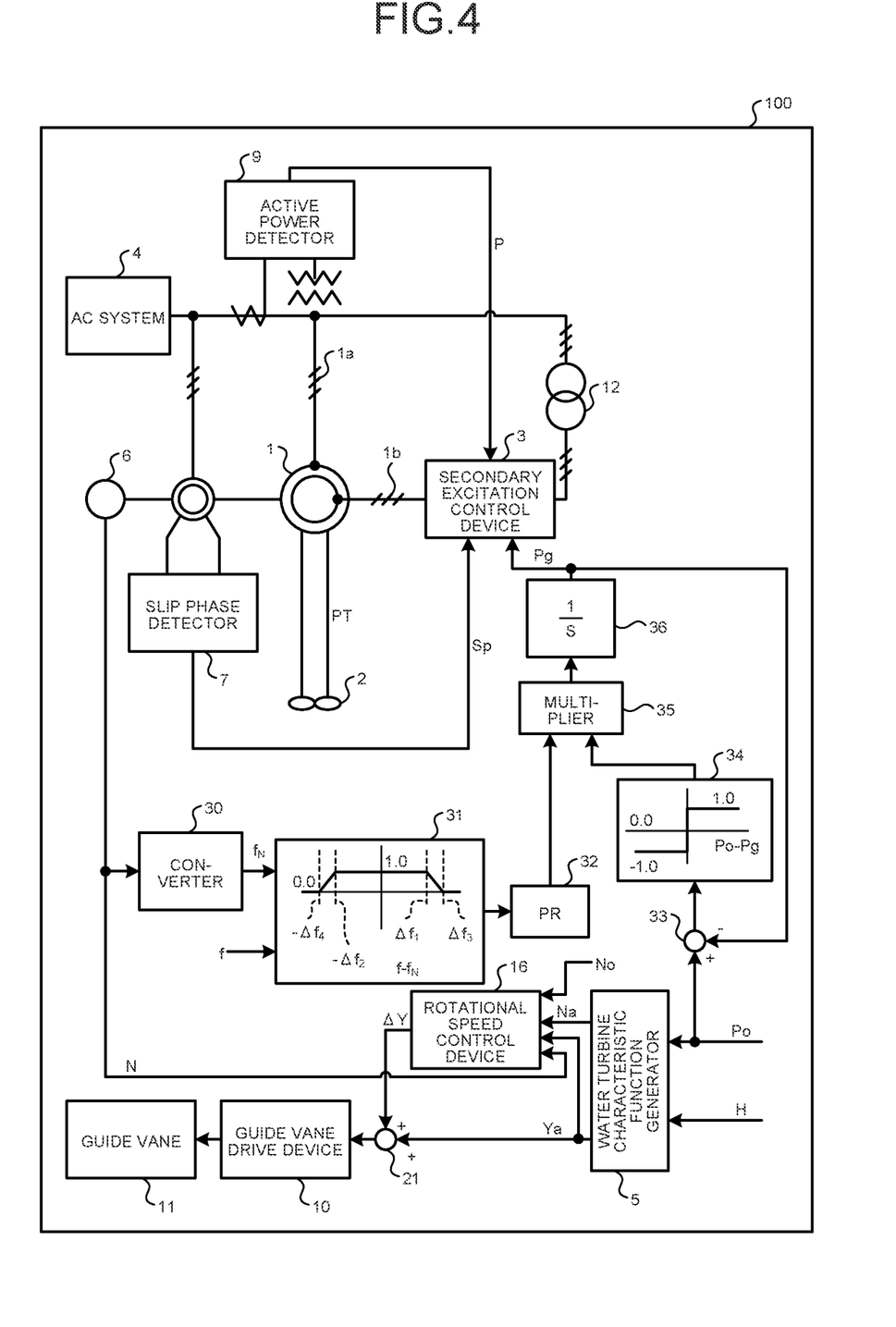
FIG. 4 is a configuration diagram of a conventional secondary excitation variable speed pumped-storage power generation device.

FIG. 4 is a configuration diagram of a secondary excitation variable speed pumped-storage power generation device 100 disclosed in Patent Literature 1. In FIG. 4, a generator motor is denoted by 1. The generator motor 1 performs variable speed operation in such a manner that AC power having a frequency equal to that of an AC system 4 is output from primary winding 1$a$ of the generator motor 1, by being rotationally driven by a pump turbine 2 directly connected to a rotor and supplying an AC excitation current adjusted to a predetermined frequency according to a rotational speed N of the generator motor 1 to secondary winding 1$b$ of the generator motor 1 by a secondary excitation control device 3 including a frequency converter.

A water turbine characteristic function generator is denoted by 5. The water turbine characteristic function generator 5 receives an externally provided power generation output command Po and water level detection signal H, and generates an optimum rotational speed command Na and optimum guide vane opening Ya for operating under the optimum operating condition. A rotational speed control device is denoted by 16. The rotational speed control device 16 compares the optimum rotational speed command Na with an actual rotational speed N detected by a rotational speed detector 6 and outputs a guide vane opening correction signal $\Delta Y$. The optimum guide vane opening Ya from the water turbine characteristic function generator 5 together with the guide vane opening correction signal $\Delta Y$ are energized by an adder 21 and input to a guide vane control device 10, and the guide vane control device 10 controls a guide vane 11.

A slip phase detector is denoted by 7. The slip phase detector 7 detects a slip phase Sp equal to the difference between the potential phase of the AC system 4 and the secondary-side rotation phase of the generator motor 1 expressed in electric angle. This Sp is input to the secondary excitation control device 3. In addition, an output $f_N$ of a converter 30 that calculates the equivalent of the synchronous frequency the generator motor 1, which is a variable speed motor generator, from the actual rotational speed N detected by the rotational speed detector 6 and a frequency f of the AC system 4 are input to a power output command value change rate limiter 31.

The power output command value change rate limiter 31 outputs 1.0 (constant value) as an output signal on the assumption that no change rate limitation is set to a power output command value in the normal operation range between the upper limit value ($\Delta f_1$) and lower limit value ($-\Delta f_2$) in which the difference $f-f_N$ between $f_N$ equivalent to the synchronous frequency of the generator motor 1 and the frequency f of the AC system 4 is defined. The power output command value change rate limiter 31 further outputs, as the output signal, a value between 1.0 and 0.0 proportional to the increase or decrease in the difference $f-f_N$ when the difference $f-f_N$ is in the range between the upper limit value $\Delta f_1$ and $\Delta f_3$ and in the range between the lower limit value $-\Delta f_2$ and $-\Delta f_4$. The power output command value change rate limiter 31 further outputs 0.0 (constant value) as the output signal when the difference $f-f_N$ is above $\Delta f_3$ and when the difference $f-f_N$ is below $-\Delta f_4$. The values $\Delta f_1$, $\Delta f_3$, $-\Delta f_2$, and $-\Delta f_4$ are determined to be $\Delta f_1 < \Delta f_3$, $-\Delta f_4 < -\Delta f_2$ within the limit occurrence frequency range of the secondary excitation control device 3 so that the rotational speed N does not exceed the variable speed range limit of the secondary excitation variable speed pumped-storage power generation device 100.

A multiplier 32 multiplies the output of the power output command value change rate limiter 31 by a maximum change rate PR of the generator motor output command and outputs a power output command value change rate.

A subtractor 33 subtracts a generator motor output command Pg from the externally provided power generation output command Po and outputs a required change amount Po−Pg of the generator motor output command.

A positive/negative sign determiner 34 receives the required change amount Po−Pg of the generator motor output command, which is the output of the subtractor 33, and outputs 1.0 or −1.0 according to the positive/negative of Po−Pg. Note that the positive/negative sign determiner 34 may have a dead zone in which 0.0 is output for a predetermined positive/negative value or less in the vicinity of 0 of the value of Po−Pg.

A multiplier 35 generates a power output command value increase/decrease change rate by multiplying the power output command value change rate, which is the output of the multiplier 32, by the positive/negative sign determination value of the required change amount of the generator motor output command, which is the output of the positive/negative sign determiner 34, and outputs the generated power output command value increase/decrease change rate.

An integrator 36 integrates the power output command value increase/decrease change rate, which is the output of the multiplier 35, and generates and outputs the generator motor output command Pg.

The generator motor output command Pg and the slip phase Sp of the slip phase detector 7 are input to the secondary excitation control device 3. The secondary excitation control device 3 controls the AC excitation current supplied to the secondary winding 1b of the generator motor 1 so that an output detection signal P of the generator motor 1 to be detected by an active power detector 9 is equal to the generator motor output command Pg.

Figure 5:
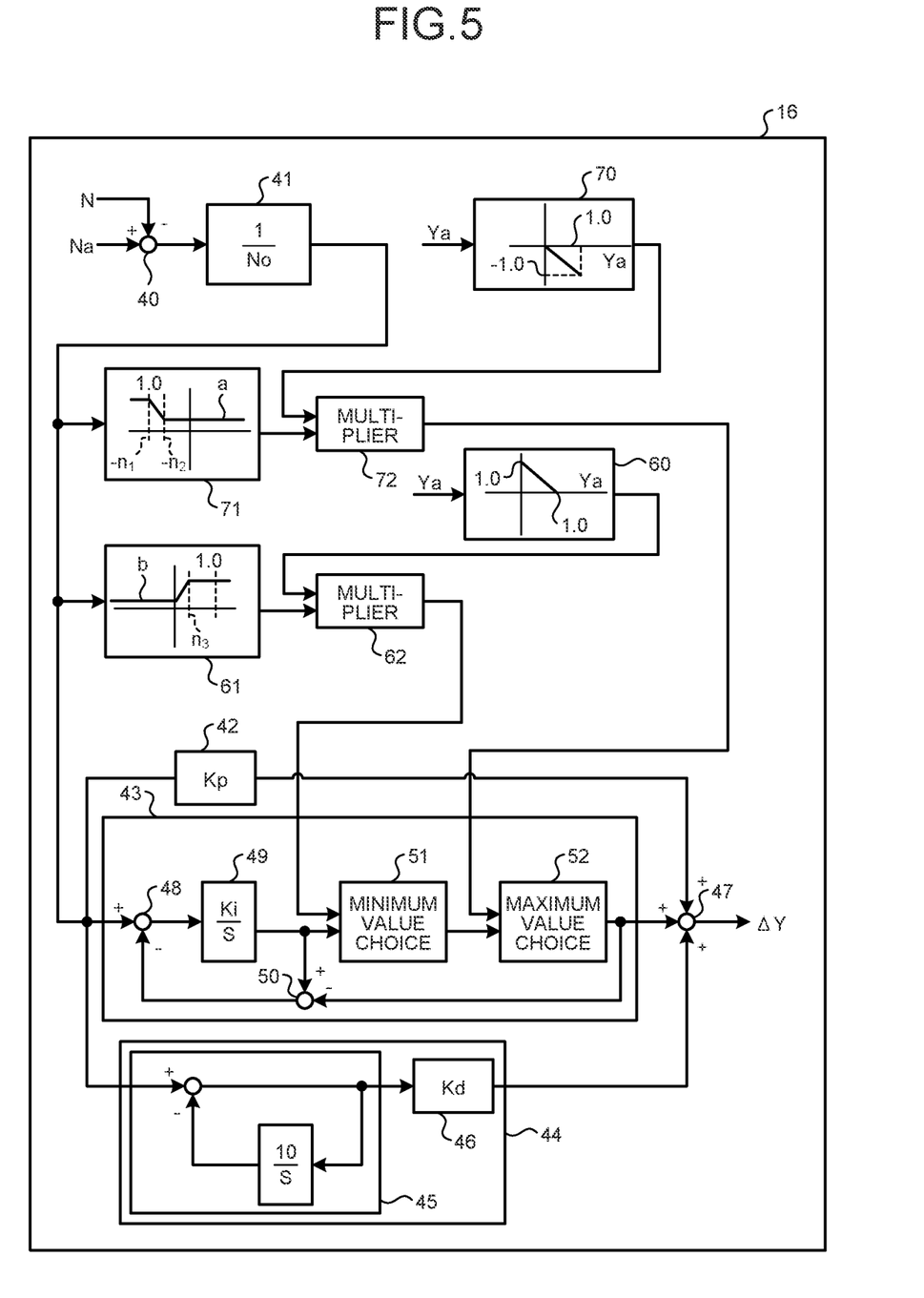
FIG. 5 is a diagram showing a configuration example of a rotational speed control device of the secondary excitation variable speed pumped-storage power generation device.

FIG. 5 is a diagram showing a configuration example of the rotational speed control device 16.

The rotational speed control device 16 includes a subtractor 40, multipliers 41 and 42, an integral control element 43, a differential control element 44, an adder 47, upper limit value limiter functions 60 and 61, a multiplier 62, lower limit value limiter functions 70 and 71, and a multiplier 72. The integral control element 43 includes subtractors 48 and 50, an integral control function 49, a minimum value choice function 51, and a maximum value choice function 52. The differential control element 44 includes an inexact differential function 45 and a multiplier 46.

The subtractor 40 receives the optimum rotational speed command Na output from the water turbine characteristic function generator 5 and the actual rotational speed N of the generator motor rotor detected by the rotational speed detector 6, subtracts the rotational speed N from the optimum rotational speed command Na, and outputs a rotational speed command deviation Na−N of the generator motor rotor.

The multiplier 41 multiplies the rotational speed deviation Na−N of the generator motor rotor, which is the output of the subtractor 40, by the reciprocal of the synchronous rotational speed No of the generator motor rotor with respect to the rated frequency of the AC system 4, and outputs a dimensionless rotational speed deviation (Na−N)/No of the generator motor rotor.

The multiplier 42 is a proportional control function of the proportional control element of the rotational speed control device 16, and outputs a signal obtained by multiplying the dimensionless rotational speed deviation (Na−N)/No of the generator motor rotor by a proportional gain Kp. In the integral control element 43, which is an integral control element of the rotational speed control device 16, the subtractor 48 subtracts the output value of the subtractor 50 from the dimensionless rotational speed deviation (Na−N)/No of the generator motor rotor, and the integral control function 49 integrates the output value of the subtractor 48 multiplied by an integral gain Ki. In addition, the minimum value choice function 51 compares the output value of the integral control function 49 with the output value of the multiplier 62 and outputs the minimum value as a limit value of the upper limit value of an integral control element output runaway preventing circuit. The maximum value choice function 52 compares the output value of the minimum value choice function 51 with the output value of the multiplier 72 and outputs the maximum value as a limit value of the lower limit value of the integral control element output runaway preventing circuit. The differential control element 44 is a differential control element of the rotational speed control device 16 and outputs a value obtained by multiplying the output value of the inexact differential function 45 to which the dimensionless rotational speed deviation (Na−N)/No of the generator motor rotor has been input by a differential gain Kd by the multiplier 46. The adder 47 adds the output value of the multiplier 42, the output value of the integral control element 43, and the output value of the differential control element 44, and outputs the result of the addition as the guide vane opening correction signal ΔY, which is the output of the rotational speed control device 16.

Note that the subtractor 50 in the integral control element 43 shown in FIG. 5 subtracts the output value of the maximum value choice function 52 from the output value of the integral control function 49 and outputs the subtraction result to the subtractor 48.

Next, the upper limit value limiter function and the lower limit value limiter function of the integral control element output runaway preventing circuit of the integral control element related to the secondary excitation variable speed pumped-storage power generation device 100 are described below.

The upper limit value limiter function 60 is an example of an upper limit value limiter function determined according to the optimum guide vane opening Ya of a conventional integral control element output runaway preventing circuit, and outputs a value from 1.0 to 0.0 with respect to an input value from 0.0 to 1.0 of the optimum guide vane opening Ya.

The upper limit value limiter function 61 is an example of an upper limit value limiter function determined according to the dimensionless rotational speed deviation (Na−N)/No, which is the output of the multiplier 41. In order to limit the positive output value of the guide vane opening correction signal ΔY due to the accumulated output in the integral control element of the rotational speed control device 16 while the rotational speed N is above the optimum rotational speed command Na, the upper limit value limiter function 61 outputs a value b when the dimensionless rotational speed deviation (Na−N)/No is 0.0 or less, proportionally outputs a value from b to 1.0 when the dimensionless rotational speed deviation (Na−N)/No is in the range of 0.0 to $n_3$, and outputs 1.0 when the dimensionless rotational speed deviation (Na−N)/No is $n_3$ or more. Here, the output value b when the dimensionless rotational speed deviation (Na−N)/No is 0.0 or less is selected within a range of 0.01 to 0.5.

The multiplier 62 multiplies the output value from the upper limit value limiter function 60 determined according to the optimum guide vane opening Ya of the integral control element output runaway preventing circuit by the output value from the upper limit value limiter function 61 with respect to the dimensionless rotational speed deviation (Na−N)/No and outputs the result.

The lower limit value limiter function 70 is an example of a lower limit value limiter function determined according to the optimum guide vane opening Ya of the conventional integral control element output runaway preventing circuit, and outputs a value from 0.0 to −1.0 with respect to an input value from 0.0 to 1.0 of the optimum guide vane opening Ya.

The lower limit value limiter function 71 is an example of a lower limit value limiter function determined according to the dimensionless rotational speed deviation (Na−N)/No, which is the output of the multiplier 41. In order to limit a negative output value of the guide vane opening correction signal ΔY due to the accumulated output in the integral control element 43 of the rotational speed control device 16 within a certain range close to 0 even while the rotational speed N is below the optimum rotational speed command Na or the rotational speed N is above the optimum rotational speed command Na, the lower limit value limiter function 71 outputs a value a when the dimensionless rotational speed deviation (Na−N)/No is equal to or greater than $-n_2$, proportionally outputs values from a to 1.0 when the dimensionless rotational speed deviation (Na−N)/No is in a range from $-n_2$ to $-n_1$, and outputs 1.0 when the dimensionless rotational speed deviation (Na−N)/No is equal to or less than $-n_1$. Here, the output value a when the dimensionless rotational speed deviation (Na−N)/No is $-n_2$ or more is selected within a range of 0.01 to 0.5. Since the optimum rotational speed command range in a power generation mode of a variable speed pump turbine is often limited to the lower side of the variable speed range, the dimensionless rotational speed deviations $-n_1$ and $-n_2$ are selected in the range of (Na−No)/No<$-n_1$<$-n_2$<0.0.

The multiplier 72 multiplies the output value from the lower limit value limiter function 70 determined according to the optimum guide vane opening Ya of the integral control element output runaway preventing circuit by the output value from the lower limit value limiter function 71 with respect to the dimensionless rotational speed deviation (Na−N)/No and outputs the result.

As described above, the secondary excitation variable speed pumped-storage power generation device 100 includes the power output command value change rate limiter 31 that applies a limit by setting the maximum change rate of the power output command to a constant value of 1.0 when the slip frequency is within the normal operation range, setting the maximum change rate of the power output command to a constant value of 0.0 when the slip frequency is below the lower limit of the normal operation range by a predetermined value or more and when the slip frequency is above the upper limit of the normal operation range by a predetermined value or more, and multiplying the maximum change rate of the power output command by a value in the range of 1.0 to 0.0 according to the deviation amount of the slip frequency from the normal operation range when the slip frequency is in the vicinity of the normal operation range, that is, when the deviation amount of the slip frequency from the lower limit of the normal operation range is within a predetermined value and when the deviation amount of the slip frequency from the upper limit of the normal operation range is within a predetermined value. As a result, it is possible to prevent the power generation output from changing suddenly. That is, it is possible to achieve a variable speed pumped-storage power generation device capable of preventing disturbance from being applied to the power system side.

By applying the control technique for a secondary excitation variable speed pumped-storage power generation device disclosed in Patent Literature 1 having such a configuration to the control of a primary excitation variable speed pumped-storage power generation device or a primary excitation variable speed power generation device, it is possible to greatly reduce the excessive overshoot and undershoot of the transient rotational speed from the optimum rotational speed command with respect to a sudden increase or decrease in the power generation output command Po even in the power generation operation of the primary excitation variable speed pumped-storage power generation device or the primary excitation variable speed power generation device. Note that Patent Literature 2 is the US patent of Patent Literature 1, and Patent Literature 3 is the EP patent of Patent Literature 1. Patent Literature 4 relates to a synchronous operation as a variable speed width deviation prevention control of a secondary excitation variable speed pumped-storage power generation device.

CITATION LIST

Patent Literature

Patent Literature 1: JP 6446569 B
Patent Literature 2: U.S. Pat. No. 10,326,393 B
Patent Literature 3: EP 3396847 B
Patent Literature 4: JP H08-317697 A

SUMMARY OF INVENTION

Problem to be Solved by the Invention

However, the variable speed range of a secondary excitation variable speed pumped-storage power generation device is at most about ±10% or less with respect to the rated rotational speed corresponding to the system frequency. Even if the maximum change rate PR of a generator motor output command or a generator output command is increased to accelerate the speed corresponding to a change in system power demand, the flow rate change time constant corresponding to the power generation output change in the water system is constant. Therefore, the output power follows the generator motor output command or the generator output command by the transfer of the inertial energy of the rotating body due to the change in rotational speed, the frequency difference $f-f_N$ in the power output command value change rate limiter 31 repeats an excessive decrease in the rotational speed above the upper limit side $f_1$ or an excessive increase in the rotational speed below the lower limit side $-f_2$, and the power output command value change rate output value of the multiplier 32 changes between 1.0 and 0.0. As a result, as shown in an analysis example of a sudden increase in power generation output (power output) from 0.8 pu. to 1.0 pu. in the secondary excitation variable speed pumped-storage power generation device in FIG. 6, the increasing rate of the generator motor output command or the generator output command is limited by the excessive increase in the frequency difference $f-f_N$ due to the decrease in the rotational speed when the power generation output during the power generation output increase is about 0.88 pu. or more, and the increase in the power output becomes gentle accordingly. With this effect, the variable speed width deviation due to the excessive decrease in the rotational speed can be prevented while monotonically increasing the power generation output in accordance with the increased in the generator motor output command or the generator output command.

Figure 6:
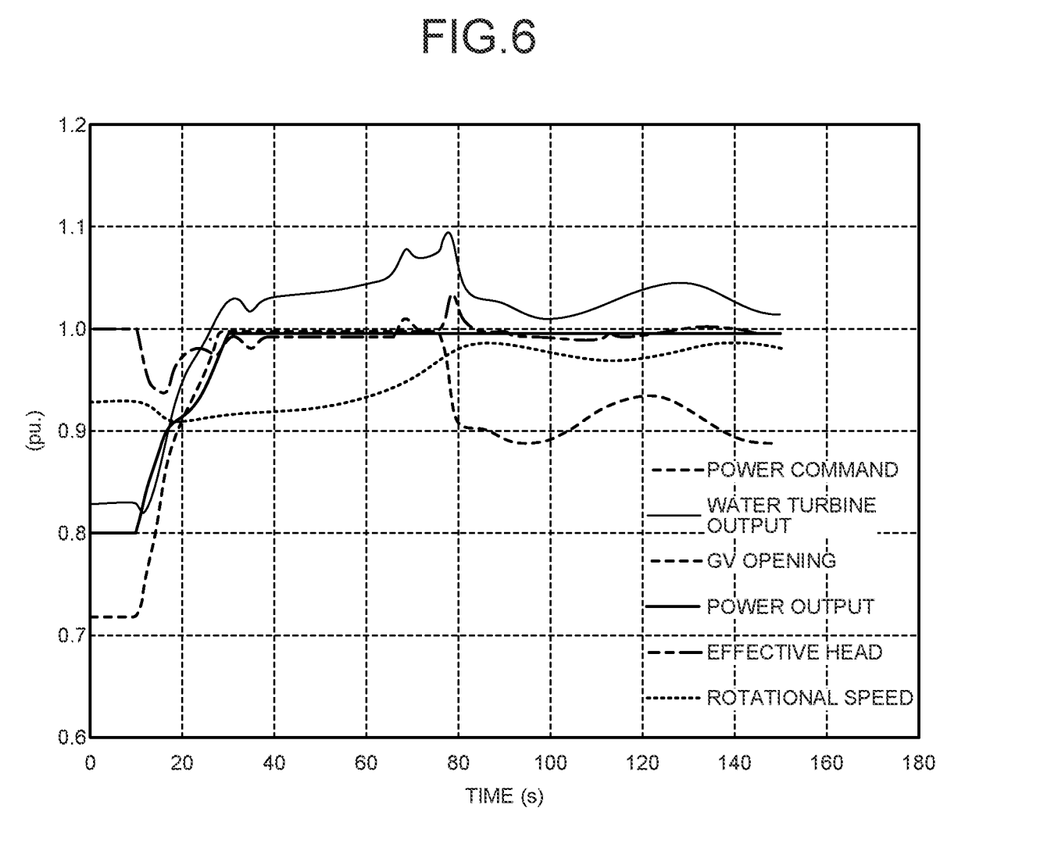
FIG. 6 is a diagram showing an analysis result example when the power generation output is suddenly increased from 0.8 pu. to 1.0 pu. at 1.0 pu./60 seconds as the maximum change rate PR of the generator motor output command in the conventional secondary excitation variable speed pumped-storage power generation device.
Figure 7:
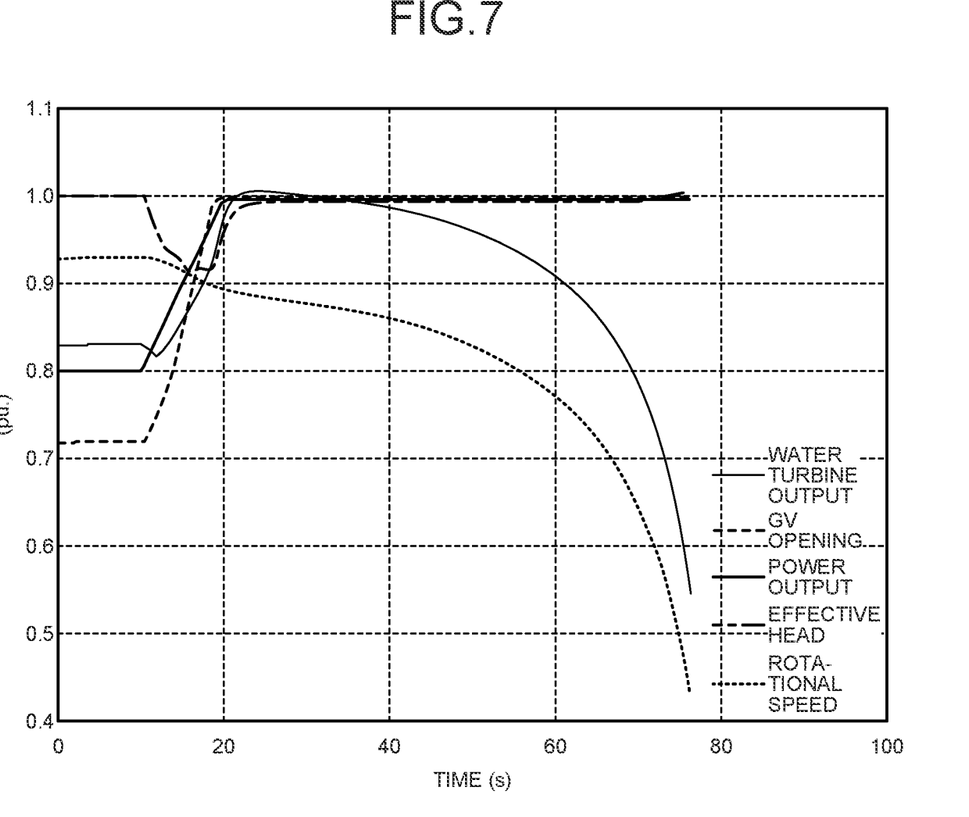
FIG. 7 is a diagram showing an analysis result example when the primary excitation variable speed pumped-storage power generation device is applied to the same power plant as the analysis example in FIG. 6, and the power generation output is suddenly increased from 0.8 pu. to 1.0 pu. at 1.0 pu./60 seconds as the maximum change rate PR of the generator motor output command.

On the other hand, FIG. 7 shows an analysis result example when a primary excitation variable speed pumped-storage power generation device having a variable speed width in a range of about −100% to +10% or less with respect to the rated rotational speed corresponding to the system frequency is applied to the same power plant as the analysis example in FIG. 6, and the set value $f_1$ of the frequency difference $f-f_N$ in the power output command value change rate limiter 31 is increased to 60% or more of the system frequency according to the variable speed width of the primary excitation variable speed pumped-storage power generation device. In FIG. 7, the power output command is not shown because the power output command and the power output perfectly matched. However, although the rotational speed gradually decreases, the power generation output linearly increases from 0.8 pu. to 1.0 pu. However, since the maximum value of the water turbine output immediately after the power output reaches 1.0 pu. is 1.006 pu. at the maximum power output ratio, which is insufficient to cover the loss of about 0.03 pu. of the electric side devices such as the generator motor and the frequency converter, a further decrease in the rotational speed leads to a decrease in the water turbine output due to a decrease in the operation efficiency on the pump turbine side. Therefore, a significant output shortage of the pump turbine due to a significant decrease in the rotational speed causes a further decrease in the rotational speed and an output shortage of the pump turbine, and a stable power generation operation cannot be continued.

Here, in FIGS. 5 and 6, the reason why the analysis is performed for a sudden increase in the power generation output from the power generation output 0.8 pu. to 1.0 pu. because the rotational speed decreasing amount when the power generation output is suddenly increased from the vicinity of the power generation output 0.8 pu. to 1.0 pu. is larger and maximum as compared to other power generation output changes.

Figure 8:
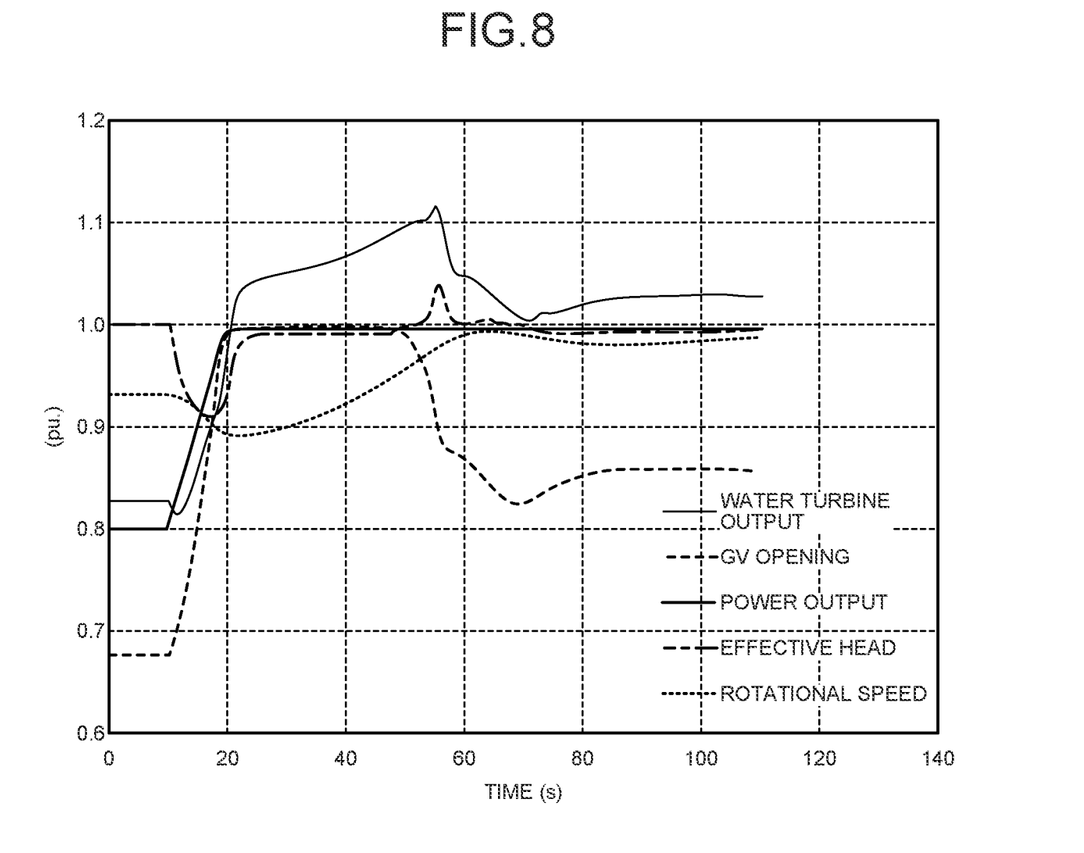
FIG. 8 is a diagram showing an analysis result example when the power generation output is suddenly increased from 0.8 pu. to 1.0 pu. at 1.0 pu./60 seconds as the maximum change rate PR of the generator motor output command in the primary excitation variable speed pumped-storage power generation device when the maximum guide vane opening is increased by about 7% in the same power plant as the analysis example shown in FIG. 7.
Figure 9:
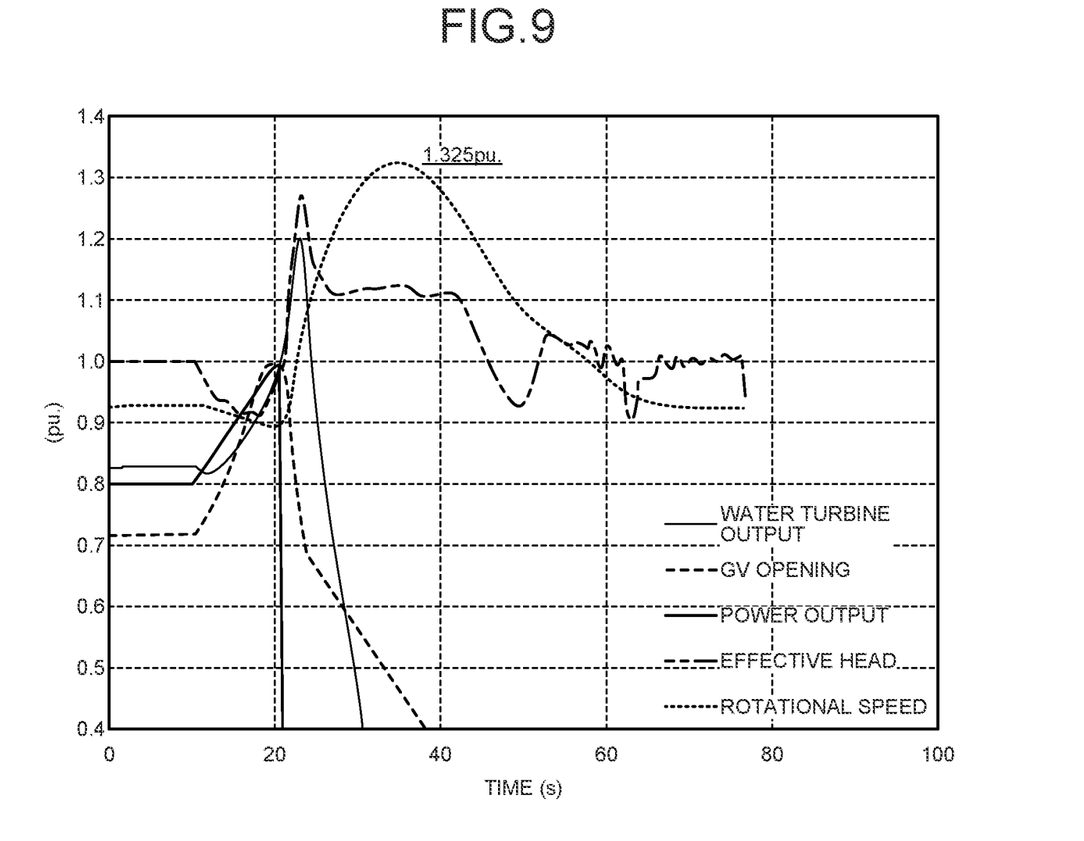
FIG. 9 is a diagram showing an analysis result example when a load interruption occurs at 21 s after the start of analysis immediately after the power generation output is suddenly increased from 0.8 pu. to 1.0 pu. at 1.0 pu./60 seconds as the maximum change rate PR of the generator motor output command as in FIG. 7.
Figure 10:
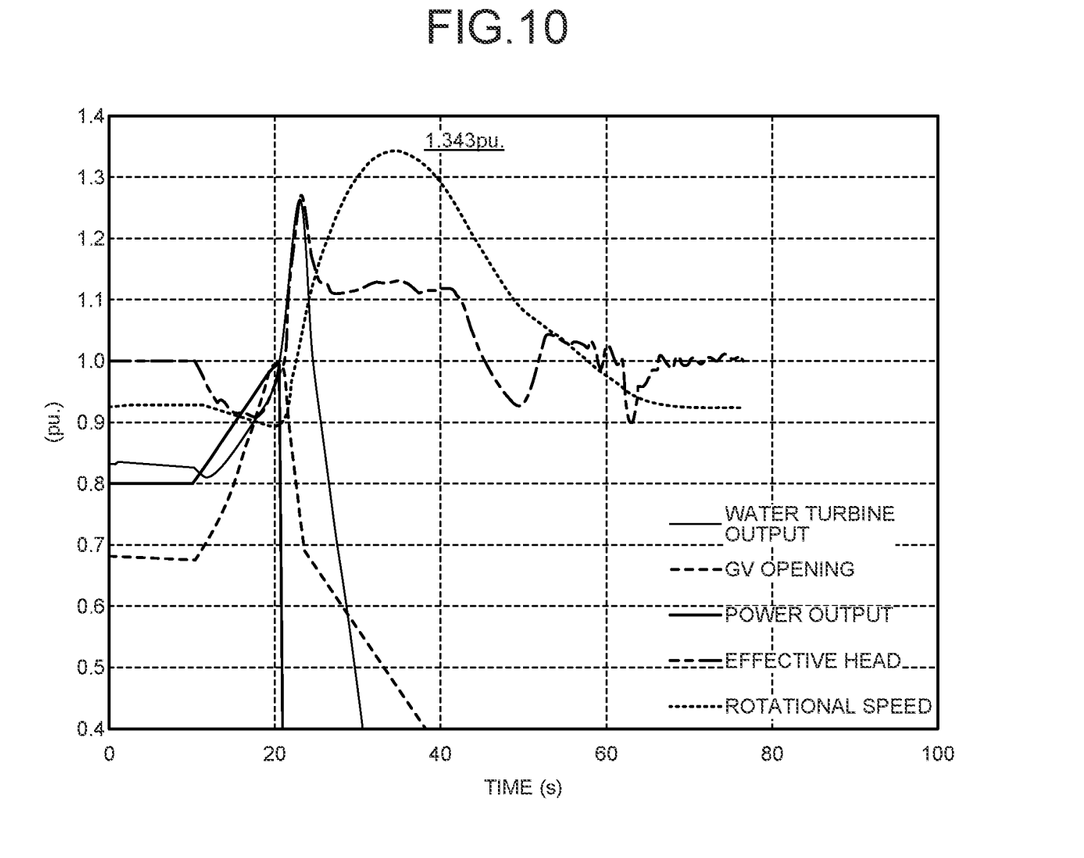
FIG. 10 is a diagram showing an analysis result example when a load interruption occurs at 21 s after the start of analysis immediately after the power generation output is suddenly increased from 0.8 pu. to 1.0 pu. at 1.0 pu./60 seconds as the maximum change rate PR of the generator motor output command in the primary excitation variable speed pumped-storage power generation device when the maximum guide vane opening is increased by about 7% in the same power plant as the analysis example shown in FIG. 7 as in FIG. 8.

As an example of means for preventing a decrease in rotational speed after the power output reaches 1.0 pu. in the analysis example shown in FIG. 7, there is a method of increasing the full-opening of the guide vane. FIG. 8 is an analysis result example when the power generation output suddenly increases from 0.8 pu. to 1.0 pu. at 1.0 pu./60 seconds as the maximum change rate PR of the power output command in the primary excitation variable speed pumped-storage power generation device when the maximum guide vane opening is increased by about 7% in the same power plant as the analysis example shown in FIG. 7. In the analysis example shown in FIG. 8, the water turbine output immediately after the power output reaches 1.0 pu. is larger than the power output by 0.03 pu. or more, and the rotational speed is also increased to about 0.98 pu. which is the optimum rotational speed command Na at the power output of 1.0 pu. However, in this example, the reached maximum rotational speed 1.343 pu. shown in FIG. 10 when a load interruption occurs immediately after the power output in the analysis example shown in FIG. 8 reaches 1.0 pu., as compared to the reached maximum rotational speed 1.325 pu. shown in FIG. 9 when a load interruption occurs immediately after the power output in the analysis example shown in FIG. 7 reaches 1.0 pu., and the reached maximum rotational speed is increased by 0.018 pu. In the analysis example shown in FIG. 8, the maximum guide vane opening is increased by about 7% compared to the analysis example shown in FIG. 7, and the non-restraint speed is also increased accordingly, so that the load on the generator motor or the generator rotor strength is increased. Therefore, from the analysis example shown in FIG. 8, it can be difficult to increase the maximum guide vane opening including the problem of the generator motor or generator rotor strength in the primary excitation variable speed pumped-storage power generation device or the primary excitation variable speed power generation device which is modified so that the generator motor or the generator of an existing constant speed pumped-storage power generation device or constant speed power generation device is used originally and that the excitation power generated in the primary stator is converted to a predetermined frequency of the commercial power system through the frequency converter, and in such a case, it is not applicable.

The present invention has been made in view of the above, and an object of the present invention is to obtain a power generation device capable of monotonically following a sudden increase or decrease in a power output command within a range from no load to a maximum output even when a large value is applied to a maximum change rate PR of a generator motor output command or a generator output command by effectively using a wide variable speed width of a primary excitation variable speed pumped-storage power generation device or a primary excitation variable speed power generation device to which protection control by synchronous operation transition disclosed in Patent Literature 4 is inapplicable. The present invention can also be applied as a substitute for synchronous operation transition, which is a variable speed width deviation prevention control for a secondary excitation variable speed pumped-storage power generation device or secondary excitation variable speed generator.

Means to Solve the Problem

In order to attain the above-described object, according to the invention, there is provided a power generation device including: a variable speed generator motor or a variable speed generator in which a secondary side DC-excited plunge pole type rotor rotates at a variable speed and a primary stator is connected to a commercial power system via a frequency converter; and a pump turbine directly connected to a rotor of the variable speed generator motor or the variable speed generator and configured to drive the rotor during a power generation operation and to be driven by the rotor during a pumping operation, wherein the power generation device is configured to: perform, in the power generation operation, speed control by providing a speed control command calculated based on a deviation between a rotational speed of the rotor and a rotational speed command by a rotational speed control device including a proportional control element, an integral control element, and a differential control element to the pump turbine, the pump turbine or the water turbine being a motor; and perform power control by providing a power output command to the variable speed generator motor or the variable speed generator, and wherein in cases that the variable speed generator motor or the variable speed generator is operated at a variable speed, and that an output of the pump turbine or the water turbine due to an increase in a decreasing rate of a rotational speed at a sudden increase in load from a partial load in a total head to a maximum output in a power plant with respect to a rotational speed command value corresponding to a maximum output is insufficient for a power output equivalent in a vicinity of a fully opened guide vane opening and the rotational speed decreases, the power generation device is configured to: stop an increase in a generator motor output command or a generator output command for a certain period of time; and cancel the stop of the increase in the generator motor output command after the rotational speed is increased until the output of the pump turbine or the water turbine is equal to or higher than a maximum power output including an electric machine side loss.

Effects of the Invention

A power generation device according to the present invention has an effect of achieving a primary excitation variable speed pumped-storage power generation device and primary excitation variable speed power generation device capable of following a sudden increase or decrease in a power output command within a range from no load to a maximum output even when a large value is applied to a generator motor output command or a maximum change rate PR of a generator output command.

DESCRIPTION OF EMBODIMENT

Hereinafter, an embodiment of a power generation device according to the present invention will be described in detail with reference to the drawings. As an example, a primary excitation variable speed pumped-storage power generation device is described, but the embodiment is also applicable to a primary excitation variable speed power generation device. Note that the present invention is not limited by the embodiment.

Embodiment

Figure 1:
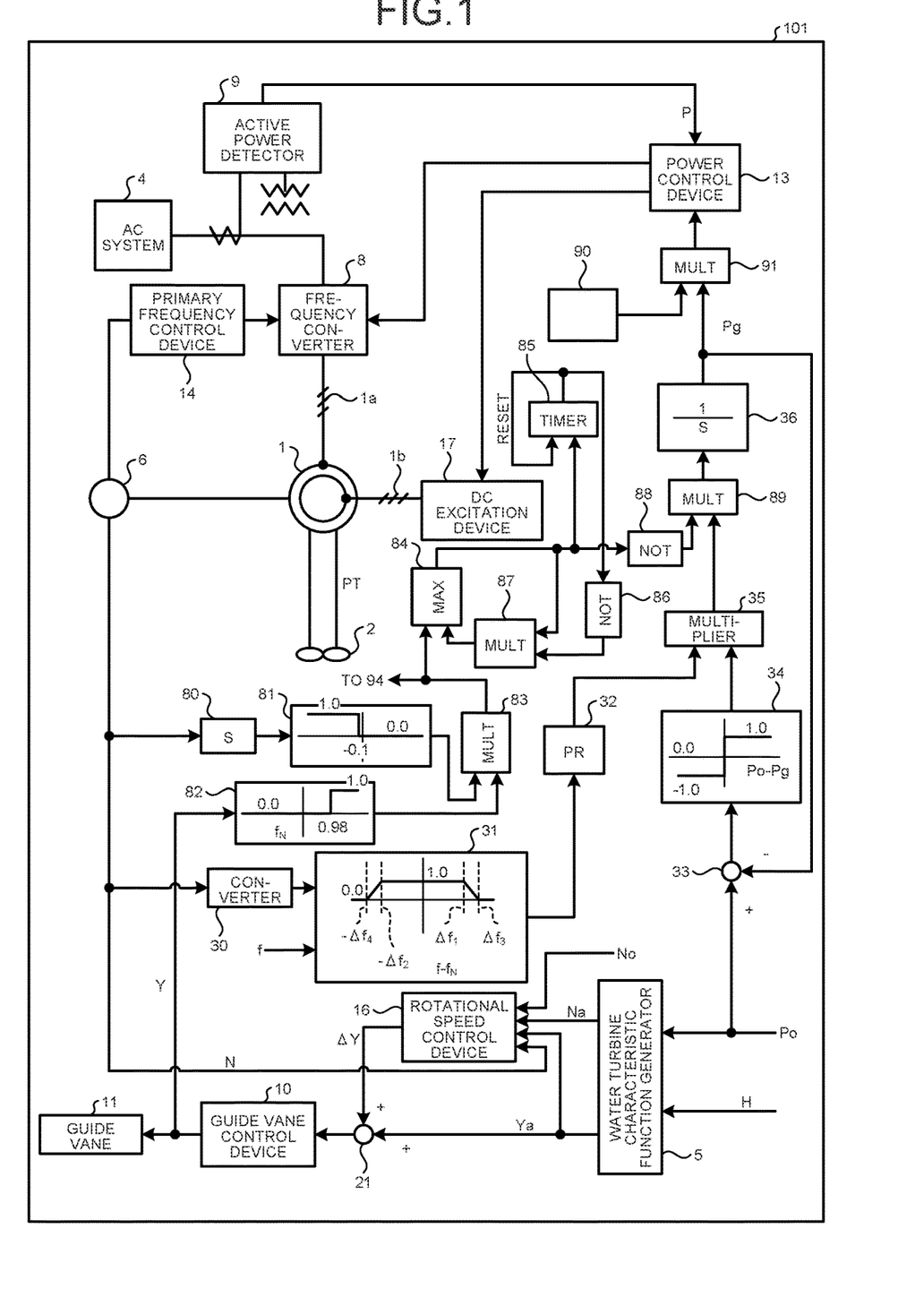
FIG. 1 is a diagram showing a configuration example of a primary excitation variable speed pumped-storage power generation device according to the present invention.

FIG. 1 is a diagram showing a configuration example of a primary excitation variable speed pumped-storage power generation device according to an embodiment. The primary excitation variable speed pumped-storage power generation device is a power generation device according to the present invention. In FIG. 1, the same reference signs as those in FIG. 4 used to describe the conventional example denote the same or corresponding parts. The parts denoted by the same reference signs as those in FIG. 4 will not be described. However, those determined to be necessary for function description are described again.

A primary excitation variable speed pumped-storage power generation device 101 shown in FIG. 1 inputs an AC power output of primary winding 1a of a generator motor 1 to a frequency converter 8 to convert the AC power output according to the frequency of an AC system 4 of a commercial power system and to output it. In addition, a power control device 13 receives a corrected generator motor output command, which is the output of an active power detector 9 and the output from a multiplier 91, outputs a DC excitation command based on them, and inputs the DC excitation command to a DC excitation device 17 to supply the DC excitation power of the rotor to secondary winding 1b of the generator motor 1.

In the primary excitation variable speed pumped-storage power generation device 101, the actual rotational speed N detected by a rotational speed detector 6 is input to a differential function 80, and the differential function 80 outputs a rotational speed change coefficient as a differential result and inputs the rotational speed change coefficient to an ON-OFF signal generator 81. The ON-OFF signal generator 81 outputs 1.0 when the rotational speed change coefficient is −0.1 or less, and outputs 0.0 when the rotational speed change coefficient is −0.1 or more. In addition, a guide vane opening Y, which is the output of a guide vane control device 10, is input to an ON-OFF signal generator 82, and the ON-OFF signal generator 82 outputs 0.0 when the guide vane opening Y is less than 0.98 pu. and outputs 1.0 when the guide vane opening Y is 0.98 pu. or more.

The output from the ON-OFF signal generator 81 and the output from the ON-OFF signal generator 82 are input to a multiplier 83. The multiplication result output from the multiplier 83 is input to a maximum value choice function 84 and an output value switching function 94 of a power output command limiter function 90 shown in FIG. 2.

The output value of the multiplier 83 and the output value of a multiplier 87 described later are input to the maximum value choice function 84. The output value from the maximum value choice function 84 is input to the multiplier 87, a timer 85 described later, and a negative function 88 described later. Although details will be described later, the maximum value choice function 84 self-holds the output signal of the multiplier 83 for the set time of the timer 85, but when the output value of the multiplier 83 is 1.0 after the set time of the timer 85 elapses, the maximum value choice function 84 self-holds the output signal of the multiplier 83 for the set time of the timer 85 again.

The normal output value of the timer 85 is 0.0, and when the output value of the maximum value choice function 84 continues 1.0, 1.0 is output after the set time. The output value of the timer 85 is input to a reset terminal of the timer 85 and a negative function 86 described later.

The negative function 86 converts the input value from the timer 85 into 0.0 when the input value is 1.0, and into 1.0 when the input value is 0.0, and outputs the converted value. The output value of the negative function 86 is input to the multiplier 87.

When the output value of the maximum value choice function 84 and the output value of the negative function 86 are input, and the output of the multiplier 83 is 1.0, the multiplier 87 self-holds the output 1.0 for the set time of the timer 85 even if the output of the multiplier 83 is 0.0.

When the output value of the maximum value choice function 84 is input, the negative function 88 converts the input 1.0 into 0.0 and the input 0.0 into 1.0, and outputs the converted value, and the output value is input to a multiplier 89 described later. As a result, the output value of the negative function 88 is 0.0 during the set time of the timer 85 after the guide vane opening Y is 0.98 pu. or more and the rotational speed change coefficient is −0.1 or less, and is 1.0 otherwise.

The multiplier 89 receives the output value of the negative function 88 and the power output command value increase/decrease change rate, which is the output of the multiplier 35, and outputs the result obtained by multiplying them as the power output command value increase/decrease change rate. The output power output command value increase/decrease change rate is input to an integrator 36. Therefore, the power output command value increase/decrease change rate output from the multiplier 89 is 0.0 during the set time of the timer 85 after the guide vane opening Y is 0.98 pu. or more and the rotational speed change coefficient is −0.1 or less, and is 1.0 otherwise.

The integrator 36 integrates the above power output command value increase/decrease change rate output from the multiplier 89 to generate and output a generator motor output command Pg, and inputs the generator motor output command Pg to a multiplier 91 described later. Therefore, the generator motor output command Pg, which is the output value of the integrator 36, stops increasing or decreasing during the set time of the timer 85 after the guide vane opening Y is 0.98 pu. or more and the rotational speed change coefficient is −0.1 or less, and otherwise increases or decreases when an externally provided power generation output command Po increases or decreases.

The multiplier 91 receives the generator motor output command Pg, which is the output value of the integrator 36, and the output value of the power output command limiter function 90 shown in FIG. 2 and described later, and outputs the multiplication result. The result of the multiplication by the multiplier 91 is input to the power control device 13.

Figure 2:
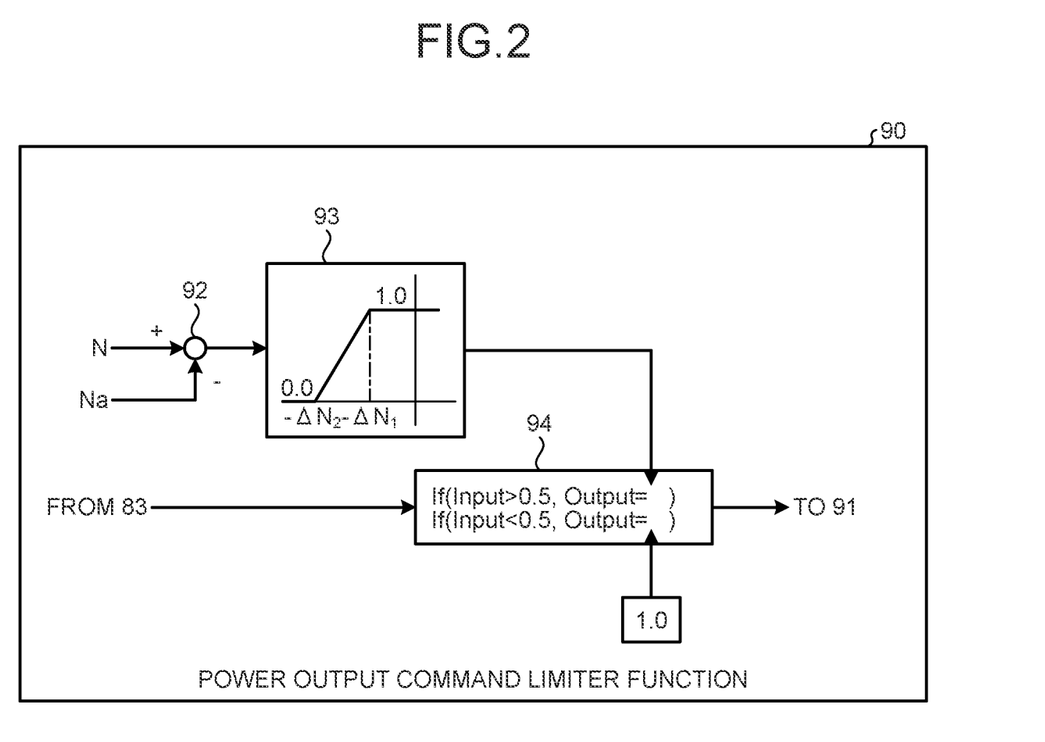
FIG. 2 is a diagram showing a configuration example of a power output command limiter function of the primary excitation variable speed pumped-storage power generation device.

FIG. 2 is a diagram showing a configuration example of the power output command limiter function 90 of the primary excitation variable speed pumped-storage power generation device 101.

In the power output command limiter function 90 shown in FIG. 2, the rotational speed N detected by the rotational speed detector 6 and an optimum rotational speed command Na output from a water turbine characteristic function generator 5 are input to the subtractor 92. The result of the subtraction by the subtractor 92 is input to a variable generator 93 that changes from 0.0 to 1.0 according to the deviation amount of the rotational speed from the optimum rotational speed command. The variable generator 93 outputs 1.0 when a result obtained by subtracting the optimum rotational speed command Na from the rotational speed N is $-\Delta N_1$ or more, outputs a value changing between 1.0 and 0.0 when the result is less than $-\Delta N_1$ to $-\Delta N_2$ or more, and outputs a value of 0.0 when the result is $-\Delta N_2$ or less. The output value of the variable generator 93 is input to the output value switching function 94.

The output value switching function 94 of the power output command limiter function 90 receives the output signal of the multiplier 83, the output signal of the variable generator 93 that changes from 1.0 to 0.0 according to the deviation amount of the rotational speed from the optimum rotational speed command, and a constant 1.0. The output signal of the output value switching function 94 of the power output command limiter function 90 is switched by the value of the output signal of the multiplier 83, the output signal of the variable generator 93 is output when the value of the output signal of the multiplier 83 is 1.0, and the constant 1.0 is output when the value of the output signal of the multiplier 83 is 0.0. Therefore, when the guide vane opening Y is 0.98 pu. or more and the rotational speed change coefficient is −0.1 or less, a value changing from 1.0 to 0.0 according to the deviation amount of the rotational speed N from the optimum rotational speed command Na is output, and otherwise, the constant 1.0 is output. That is, in the region of deviation amount of the rotational speed N from the optimum rotational speed command Na in which it is difficult to recover the rotational speed decrease even by the stop of the increase or decrease in the generator motor output command Pg by the output of the multiplier 89, the power output command limiter function 90 multiplies the generator motor output command Pg by a value that changes from 1.0 to 0.0 according to the deviation amount of the rotational speed N of the power output command limiter function 90 from the optimum rotational speed command Na to reduce the generator output and recover the rotational speed decrease.

Figure 3:
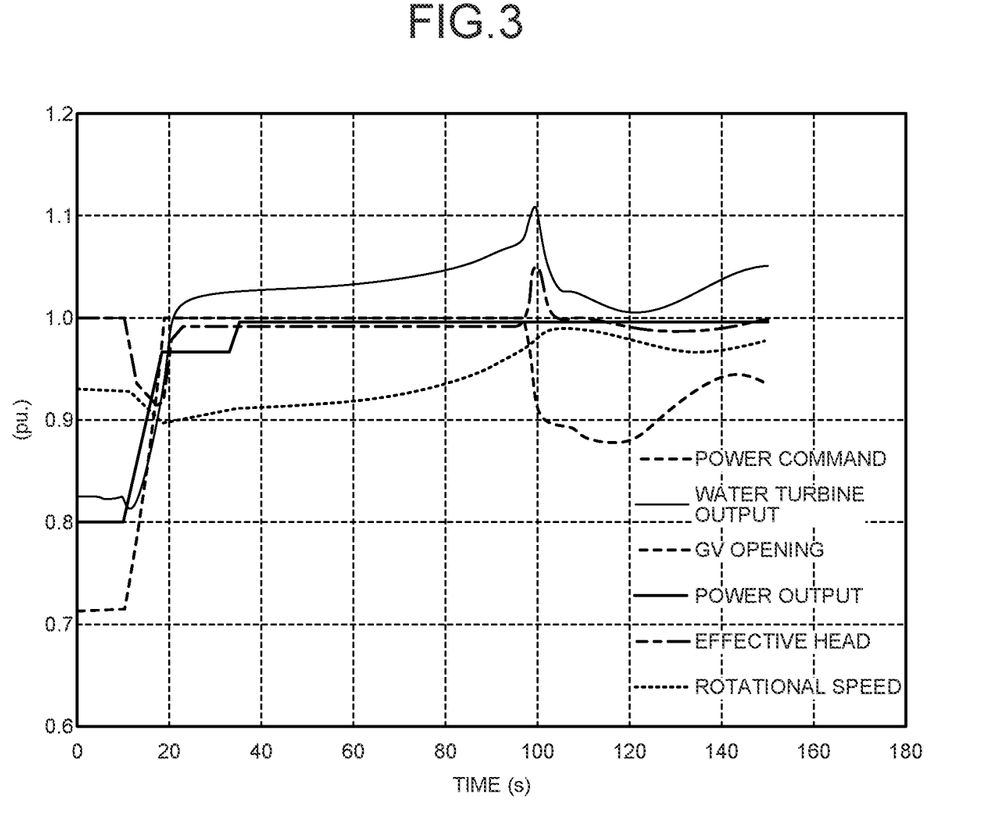
FIG. 3 is a diagram showing an analysis result example when the primary excitation variable speed pumped-storage power generation device is applied to the same power plant as the analysis example shown in FIG. 7, and the increase in a generator motor output command Pg is stopped for 15 seconds when the rotational speed is decreased while the guide vane opening is 0.98 pu. or more when the power generation output is suddenly increased from 0.8 pu. to 1.0 pu. at 1.0 pu./60 seconds as a maximum change rate PR of the generator motor output command, and then the stop of the increase in the generator motor output command is canceled after the rotational speed is increased until the water turbine output is equal to or greater than the maximum power output including the electric machine side loss.

FIG. 3 is a diagram showing an analysis result example when the primary excitation variable speed pumped-storage power generation device is applied to the same power plant as the analysis example shown in FIG. 7, and the increase in the generator motor output command Pg is stopped for 15 seconds, which is the set time of the timer 85, when the rotational speed is decreased while the guide vane opening is 0.98 pu. or more when the power generation output is suddenly increased from 0.8 pu. to 1.0 pu. at 1.0 pu./60 seconds as the maximum change rate PR of the generator motor output command, and then the stop of the increase in the generator motor output command is canceled after the rotational speed is increased until the water turbine output is equal to or greater than the maximum power output including the electric machine side loss. In FIG. 3, the result of the subtraction of the optimum rotational speed command Na from the rotational speed N is not reduced until the output value of the power output command limiter function 90 is less than 1.0.

As described above, the primary excitation variable speed pumped-storage power generation device 101 according to the present embodiment stops, for a certain period of time, an increase in a generator motor output command when an output of the pump turbine or the water turbine due to an increase in a decreasing rate of a rotational speed at a sudden increase in load from a partial load to a maximum output with respect to a rotational speed command value corresponding to a maximum output is insufficient for a maximum power output equivalent in a vicinity of a fully opened guide vane opening and the rotational speed decreases, the increase in the generator motor output command, and cancels the stop of the increase in the generator motor output command after the output of the pump turbine or the water turbine is increased until the rotational speed is equal to or higher than a maximum power output including an electric machine side loss. Furthermore, the primary excitation variable speed pumped-storage power generation device 101 according to the present embodiment includes the power output command limiter function 90 that generates a coefficient that changes from 1.0 to 0.0 when the decreasing amount of the rotational speed with respect to the rotational speed command value is a constant value or more is generated, since the decrease in the rotational speed continues even if the increase in the generator motor output command is stopped when the decreasing amount of the rotational speed with respect to the rotational speed command value is above a certain value, multiplies the coefficient by the generator motor output command to a power control device while the rotational speed is decreasing in the vicinity of the fully opened guide vane opening, and inputs it to reduce a power output and reduce the decreasing amount of the rotational speed of the pump turbine or the water turbine. In addition, the reference signs 80 to 91 shown in FIG. 1 are applied to the input side of the secondary excitation control device 3 shown in FIG. 4, and the power output limit due to the decreasing amount of the rotational speed of the power output command limiter function 90 with respect to the rotational speed command value is adjusted according to the variable speed width of a secondary excitation variable speed pumped-storage power generation device or a secondary excitation variable speed power generation device, so that it can be applied as a substitute control for synchronous operation transition, which is a variable speed deviation prevention control when the rotational speed temporarily exceeds the variable speed range limit to an allowable extent in the secondary excitation variable speed pumped-storage power generation device or the secondary excitation variable speed power generation device.

REFERENCE SIGNS LIST

1 GENERATOR MOTOR
1a PRIMARY WINDING OF GENERATOR MOTOR
1b SECONDARY WINDING OF GENERATOR MOTOR
2 PUMP TURBINE
3 SECONDARY EXCITATION CONTROL DEVICE
4 AC SYSTEM
5 WATER TURBINE CHARACTERISTIC FUNCTION GENERATOR
6 ROTATIONAL SPEED DETECTOR
7 SLIP PHASE DETECTOR
8 FREQUENCY CONVERTER
9 ACTIVE POWER DETECTOR
10 GUIDE VANE CONTROL DEVICE
11 GUIDE VANE
12 POWER RECEIVING TRANSFORMER
13 POWER CONTROL DEVICE
14 PRIMARY FREQUENCY CONTROL DEVICE
16 ROTATIONAL SPEED CONTROL DEVICE
17 DC EXCITATION DEVICE
21, 47 ADDER
30 CONVERTER
31 POWER OUTPUT COMMAND VALUE CHANGE RATE LIMITER
32, 35, 41, 42, 46, 62, 72, 83, 87, 89, 91 MULTIPLIER
33, 40, 48, 50, 92 SUBTRACTOR
34 POSITIVE/NEGATIVE SIGN DETERMINER
36 INTEGRATOR
43 INTEGRATION CONTROL ELEMENT
44 DIFFERENTIAL CONTROL ELEMENT
45 INEXACT DIFFERENTIAL FUNCTION
49 INTEGRATION CONTROL FUNCTION
51 MINIMUM VALUE CHOICE FUNCTION
52, 84 MAXIMUM VALUE CHOICE FUNCTION
60, 61 UPPER LIMIT VALUE LIMITER FUNCTION
70, 71 LOWER LIMIT VALUE LIMITER FUNCTION
80 DIFFERENTIAL FUNCTION
81, 82 ON-OFF SIGNAL GENERATOR
85 TIMER
86, 88 NEGATIVE FUNCTION
90 POWER OUTPUT COMMAND LIMITER FUNCTION
93 VARIABLE GENERATOR
94 OUTPUT-VALUE SWITCHING FUNCTION
100 SECONDARY EXCITATION VARIABLE SPEED PUMPED-STORAGE POWER GENERATION DEVICE
101 PRIMARY EXCITATION VARIABLE SPEED PUMPED-STORAGE POWER GENERATION DEVICE

The invention claimed is:
1. A power generation device comprising:
a variable speed generator motor or a variable speed generator in which a secondary side DC-excited plunge pole type rotor rotates at a variable speed and a primary stator is connected to a commercial power system via a frequency converter; and
a pump turbine or a water turbine directly connected to a rotor of the variable speed generator motor or the variable speed generator and configured to drive the rotor during a power generation operation and to be driven by the rotor during a pumping operation, wherein the power generation device is configured to:

perform, in the power generation operation, speed control by providing a speed control command calculated based on a deviation between a rotational speed of the rotor and a rotational speed command by a rotational speed control device including a proportional control element, an integral control element, and a differential control element to the pump turbine or the water turbine, the pump turbine or the water turbine being a motor, and perform power control by providing a power output command to the variable speed generator motor or the variable speed generator, and wherein in cases that the variable speed generator motor or the variable speed generator is operated at a variable speed, and that an output of the pump turbine or the water turbine due to an increase in a decreasing rate of a rotational speed at a sudden increase in load from a partial load in a total head to a maximum output in a power plant with respect to a rotational speed command value corresponding to a maximum output is insufficient for a power output equivalent in a vicinity of a fully opened guide vane opening and the rotational speed decreases, the power generation device is configured to:

stop an increase in a generator motor output command or a generator output command for a certain period of time; and cancel the stop of the increase in the generator motor output command or the generator output command after the rotational speed is increased until the output of the pump turbine or the water turbine is equal to or higher than a maximum power output including electric machine losses of the variable speed generator motor or the variable speed generator and the frequency converter as well as a DC excitation device.

2. The power generation device according to claim 1, when a decreasing amount of the rotational speed with respect to the rotational speed command value is above a certain value, the power generation device is configured to:

generate a coefficient that changes from 1.0 to 0.0 when the decrease in the rotational speed continues even if the increase in the generator motor output command or the generator output command is stopped and the decreasing amount of the rotational speed with respect to the rotational speed command value is a constant value or more;

reduce a power output by multiplying the coefficient by the generator motor output command or the generator output command to a power control device while the rotational speed is decreasing in the vicinity of the fully opened guide vane opening and by inputting the multiplied the generator motor output command or the generator output command; and reduce the decreasing amount of the rotational speed of the pump turbine or the water turbine.

* * * * *